Feb. 4, 1936.   G. PIRICH   2,029,833
WEEDER AND SEEDER
Filed Aug. 13, 1934
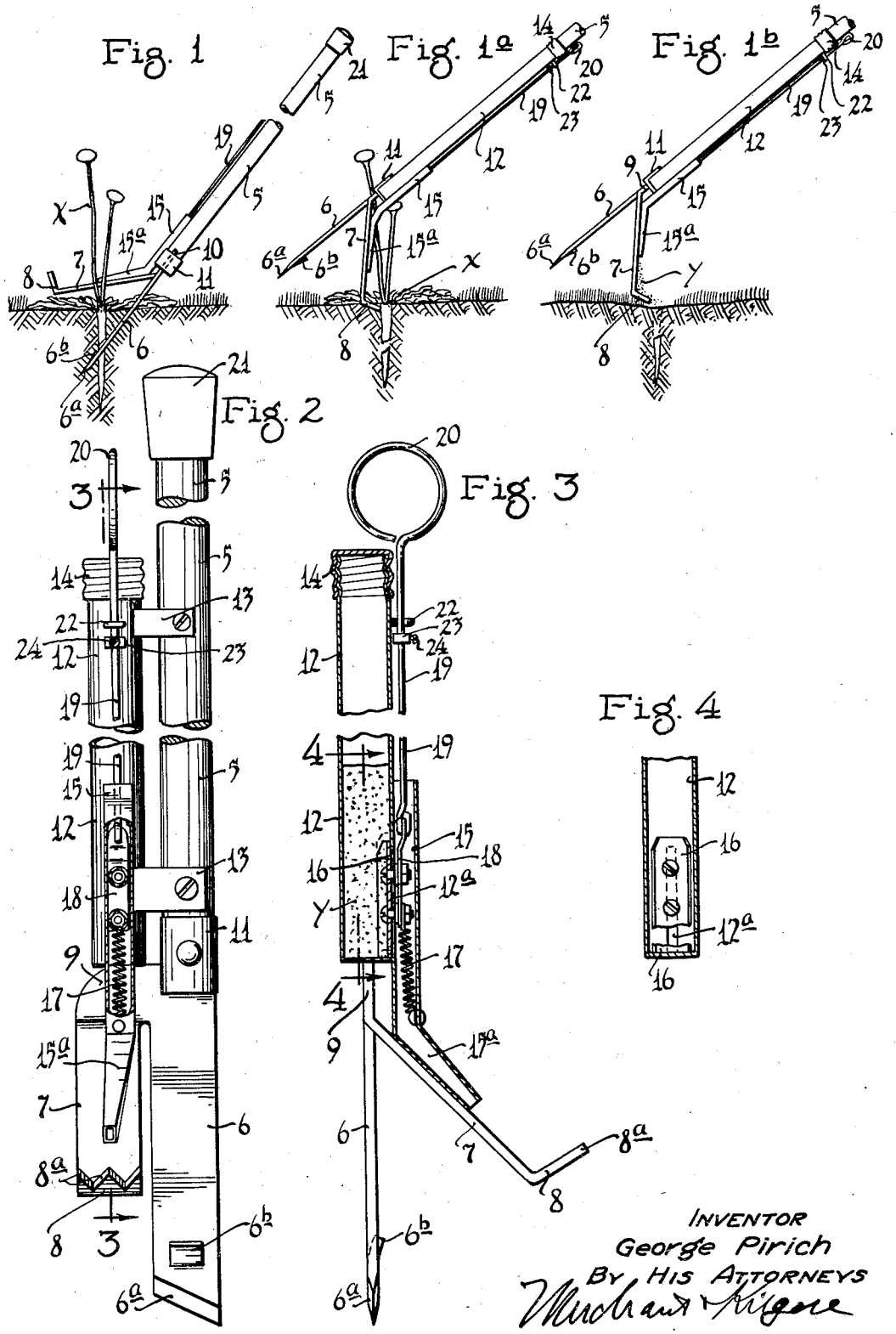
INVENTOR
George Pirich
By his Attorneys Patented Feb. 4, 1936

2,029,833

UNITED STATES PATENT OFFICE 2,029,833

WEEDER AND SEEDER

George Pirich, Minneapolis, Minn.

Application August 13, 1934, Serial No. 739,587

1 Claim. (Cl. 111—95)

My present invention relates to improvements in weeding tools and has for its main object the provision of an extremely simple and highly efficient device for the destruction of dandelions and like weeds or objectionable growths, such as frequently found on lawns.

The present invention is in the nature of an improvement on the device disclosed and claimed in my pending application, Serial Number 731,633, filed June 21, 1934, and entitled "Weeding tool".

The improved weeding tool renders the removal of such noxious plants easily and quickly accomplished without disturbing the soil or desirable plant life such as grass closely adjacent thereto; and as a main feature, the invention provides means for quickly and effectually planting grass seed in the places where the dandelion or the like has been removed.

Generally stated, the invention consists of the novel devices, combinations of devices and arrangement of parts hereinafter described and defined in the claim.

In the drawing which illustrates the invention, like characters indicate like parts throughout the several views.

Referring to the drawing:

Figs. 1, 1a, and 1b are views in side elevation illustrating the different uses of the device in the removal of dandelions and the like, and in the planting of grass seed;

Fig. 2 is a front elevation of the device showing the same on a much larger scale than Figs. 1, 1a, and 1b, some parts being broken away;

Fig. 3 is a section taken on the line 3—3 of Fig. 2, some parts being shown in full; and Fig. 4 is a fragmentary section taken on the line 4—4 of Fig. 3.

The weeding tool comprises a handle-acting stem 5, a weed root-cutting blade 6, projecting outwardly from one end of the stem 5, and provided at its free end with a cutting edge 6a, and a rake arm 7 that projects from the stem anchored end of the blade 6 in diverging relation to a face of the cutting blade 6 and the stem 5. This arm 7 is offset, at its free end, in a direction away from the plane of the blade 6 to afford a weed-extracting rake head 8.

Preferably, and as illustrated, the cutting blade 6 and rake arm 7 are integrally formed from a flat sheet of steel which is longitudinally slit to provide laterally spaced primarily parallel blades 6 and rake arm 7, the rake arm 7 being bent into diverging relation to the blade 6 and stem 5 and the free end of the arm 7 being offset to form the rake head 8 in a subsequent operation. Also, in the preferred embodiment of the invention illustrated, the rake head 8 is serrated to afford a plurality of V-shaped rake teeth 8a.

Above the rake arm 7 the head of the tool, indicated as an entirety by 9, is provided, preferably in alignment with the blade 6, with an anchoring shank 10 that is inserted into the stem 5 and firmly clamped against displacement by a suitable clamping band or ferrule 11.

In use, the taproot X' of a weed, such as a dandelion X, is first cut, preferably two to four inches below the ground surface, by inserting the blade 6 diagonally into the ground and through the root as illustrated in Figure 1, and then the blade is withdrawn, the head turned completely over, and the weed, including its foliage and all of the root above the cut, is raked out by employing the tool as illustrated in Figure 1a. Adjacent teeth 8a of the rake head grip the taproot X' just below the foliage and render extraction of the cut taproot easily and readily accomplished without displacing or disturbing adjacent plants or soil.

By reference to the drawing, it will be seen that the rake arm 7, due to its diverging relation to the stem 5 and cutting blade 6, will not interfere in any way with free insertion of the blade into the ground. Further it will be seen that the rake arm, due to its laterally offset relation to the cutting blade, will not obstruct the operator's view of the cutting blade from a naturally assumed standing position directly behind and in a line with the stem 5 and blade 6, and, therefore, will not in any way hamper the operator in properly positioning the blade 6 in respect to a taproot.

It will likewise be apparent that the cutting blade 6 will not obstruct the operator's view of the rake arm while using the rake to extract a root.

As a very desirable feature, the chisel-acting blade 6 near its cutting edge is provided with a laterally pressed backwardly turned lip 6b. Under downwardly cutting movements of blade 6 the upwardly diverging face of lip 6b engages the cut root and by camming action thereon, lifts the same slightly, thereby loosening the same somewhat from the earth and under withdrawing movements of the blade, the abrupt outer end of the lip 6b catches more or less on the cut portion of the root and by jarring action, further loosens the same.

The seed-dispensing or dropping device comprises a tubular magazine 12 which, by means of clips 13, is rigidly secured to the stem or handle bar 5 in parallel relation thereto and with its lower end overlying the upper portion of the rake arm or blade 7. At its upper end, the magazine is shown as provided with a movable cap 14 and at its lower end is provided with a discharge port 12a that opens into a discharge spout 15. This discharge spout 15 is rigidly secured to the magazine 12 and is provided with an offset discharge nozzle 15a that underlies the oblique rearwardly facing surface of the rake arm or blade 7 and discharges onto the upper face of the rearwardly projecting rake heat 8, as best shown in Figs. 1a—1b, 2 and 3. The discharge port 12a of the magazine 12 is normally closed by a gate 16 slidably mounted on the inner wall of the magazine and yieldingly pressed downward by a coiled spring 17 which, as shown, is located within the spout 15, is anchored thereto at its lower end, and at its upper end is connected to said gate by a link 18. For lifting the gate when desired to produce a discharge of seed y from the magazine, there is provided a pull device in the form of a light rod 19, the lower end of which is attached to the upper end of the link 18 and the upper end of which is shown as provided with a finger loop 20 located adjacent to the head of the stem 5 so that it may be gripped by a finger of the hand applied to the end of said stem.

Preferably and as shown, the stem 5 is provided at its extreme upper end with a cap 21 of rubber or the like, which gives the operator a better grip for holding the device. The rod 19 works through a guide lug 22 on the magazine and is provided with a stop collar 23 shown as adjustably but rigidly secured thereto by a set screw 24. By adjustments of the collar 23 on the rod 19, the extent to which the gate will be opened when upwardly pulled and hence the amount of seed discharged by a quick manipulation of the gate may be varied.

The use of the tool for extracting dandelion roots and the like has already been described. Fig. 1 shows the use of the device for cutting off the dandelion root below the ground. Fig. 1a shows the use of the device to rake up the cut root and the head of the dandelion. After the dandelion has been removed and while the device is still held in the position shown in Figs. 1, 1a and 1b, if seed is to be planted in the hole or depression made by the removal of the dandelion root, this may be quickly done simply by giving a quick pull and release of the gate-operating rod. By reference to Fig. 1b particularly, it will be noted that when the seed falls, it will be guided by the rake arm or blade 7 and its offset rake end 8 directly to the spot where the seed should be planted.

The efficiency of this device has been thoroughly demonstrated in practice.

What I claim is:

The combination with a weed-extracting tool comprising a handle-acting stem and an arm projecting from one end of the handle in outwardly diverging relation to the axis thereof and having its free end portion outwardly offset to afford a backwardly diverging rake-acting head, of a seed magazine terminating in a nozzle arranged to discharge along the rear face of the diverging arm and onto the rear face of the backwardly diverging rake head.

GEORGE PIRICH.